Sept. 1, 1970  J. L. RUBRICIUS  3,526,481
BLOOD OXYGENATOR
Filed Jan. 29, 1968  6 Sheets-Sheet 3

FIG. 5

INVENTOR.
JEANETTE L. RUBRICIUS
BY
*Stowell & Stowell*
ATTORNEYS

United States Patent Office

3,526,481
Patented Sept. 1, 1970

3,526,481
BLOOD OXYGENATOR
Jeanette L. Rubricius, Durham House, Durham Place,
London, SW.3, England
Continuation-in-part of application Ser. No. 409,062,
Nov. 5, 1964. This application Jan. 29, 1968, Ser.
No. 709,520
Int. Cl. A61m 1/03
U.S. Cl. 23—258.5                              7 Claims

ABSTRACT OF THE DISCLOSURE

Blood oxygenating apparatus delivers oxygen in the form of hydrogen peroxide into the blood by allowing this oxygenating agent to diffuse into the blood across a membrane.

Hydrogen peroxide is introduced slowly into the blood with complete mixing in apparatus which includes a membrane means by which the blood, optionally filmed, is separated from a perfusion system; a pump for circulating the perfusate fluid in contact with the membrane means; and servo controls for metering the hydrogen peroxide into the perfusate fluid.

The servo senses the redox level in the returned perfusate fluid, and optional means are included for aerating the returned perfusate to remove carbon dioxide therefrom.

---

This application is a continuation-in-part of application Ser. No. 409,062, filed Nov. 5, 1964, now abandoned.

The present invention relates to means for oxygenating blood, and more specifically to an apparatus and method which utilizes electronic servo-controlled arrangements to oxygenate human blood in place of the lungs.

In the performance of surgery of the heart and great vessels, it has become standard procedure to use a pump to substitute the pumping action of the heart and an oxygenator to oxygenate the blood in place of the lungs. In this manner, the heart and lungs of the patient are bypassed into a mechanical apparatus. Blood is difficult to oxygenate, even at high oxygen concentrations, since diffusion of the oxygen into the blood will cause a progressively lower oxygen pressure or tension in the blood as the distance from the oxygen surface increases. Thus, the oxygen pressure a few mils from the gas liquid interface will not be sufficient to oxygenate the blood. In order to overcome this defect, various schemes have been devised to increase the surface of blood which is available to the gas. These schemes include filming the blood on a rotating cone, filming the blood on a rotating disc which dips into blood, and increasing the surface of the blood by formation of bubbles.

Mechanical oxygenators have the disadvantage that they produce trauma to red blood cells and result in a certain amount of hemolysis. They also remove platelets from the circulating blood and cause hemorrhagic diathesis. The methods subject the patient to possibilities of air emboli and in addition require large priming volumes of blood. They have another disadvantage of having restrictive flow rates unless the size of the apparatus is considerably increased. The entire process must be done outside the body and the blood must be heparinized or treated with an anti-coagulant in order to prevent clotting.

In accordance with the present invention the blood continues its flow by means of an artificial heart pump and is not subjected to mechanical stress; thereby the new oxygenation system differs conceptually from that of the prior art. In the known mechanical oxygenators an attempt is made to bring the blood into contact with the oxygen; in the present invention to be described, oxygen is brought directly to the flowing blood.

One of the objects of the present invention, therefore, is to provide a method and apparatus for oxygenating blood which utilizes an electronic oxygen tension detecting device, the signal from which after suitable amplification may control a servo motor operating a meterting pump which delivers oxygen in the form of hydrogen peroxide into the blood to be oxygenated. The servo motor delivers the necessary amount of hydrogen peroxide into the blood to saturate the blood with oxygen up to a predetermined amount which may be established by levels set in the detecting device, or in the amplifier or servo loop elements.

A more specific object of the invention, in one embodiment thereof, is to provide an apparatus for oxygenating blood which includes a gas permeable tube through which the blood to be oxygenated may be pumped and into which oxygen under pressure may pass; together with means to provide that the oxygen pressure shall never be greater than the hydraulic pressure in order to safeguard against oxygen embolization.

It is a further object of the invention to provide a blood oxygenating apparatus which includes a servo system to regulate the pressure of the applied oxygen so that the blood may be oxygenated to a predetermined level, together with an oxygen saturation determining device followed by a suitable amplification system which controls the servo motor to regulate the pressure of the oxygen gas through appropriate valving.

Yet another object of the invention, in a further embodiment thereof, is to provide a blood oxygenating method and apparatus whereby oxygen dissolved in a fluid is introduced into the blood. The appropriate amount of the oxygen-containing solution which may be injected into the blood is determined by means of an electrical sampling probe oxygen tension determining device; the signal from which, after appropriate amplification, controls a valve through which the oxygen-containing solution flows.

Still a further object of the invention is to provide, in the embodiment of the oxygenator which utilizes oxygen dissolved in a fluid, automatic control means operative to protect against accidental oxygen embolization of the blood under treatment should the available fluid level into which the oxygen is dissolved fail while the oxygen supply is connected thereto.

An additional object of the present invention is to provide a further embodiment wherein a suitable buffer solution may be introduced into the blood as it is oxygenated, and the pH level of blood after the buffer is added may be electrically sensed to develop a control signal which, after amplification, may control a servo motor which regulates the introduction rate of the buffer solution.

It is an object of yet another embodiment of the present invention to deliver oxygen in the form of hydrogen peroxide into the blood by allowing the hydrogen peroxide to diffuse into the blood across a membrane. According to this embodiment, hydrogen peroxide is introduced slowly into the blood with complete mixing in apparatus which includes membrane means by which the blood is separated from a perfusion system; a pump for circulating the perfusate in contact with the membrane means; and suitable servo controls for metering the hydrogen peroxide into the perfusate.

The above and other objects and advantages of the invention will become apparent in the following detailed description of the several embodiments thereof, when taken in conjunction with the accompanying drawings, wherein:

Figure 1:
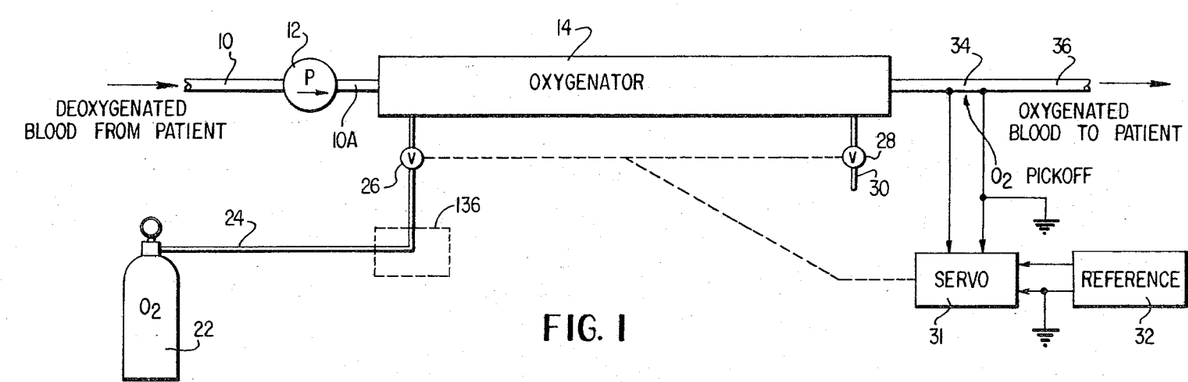
FIG. 1 is a general schematic representation of the blood oxygenation apparatus.

As illustrated in FIG. 1, deoxygenated blood from the patient is drawn through tubing 10 by means of a positive displacement hydraulic pump 12 of any suitable type and passed into the oxygenator 14 through a section of tubing 10A.

Figure 2:
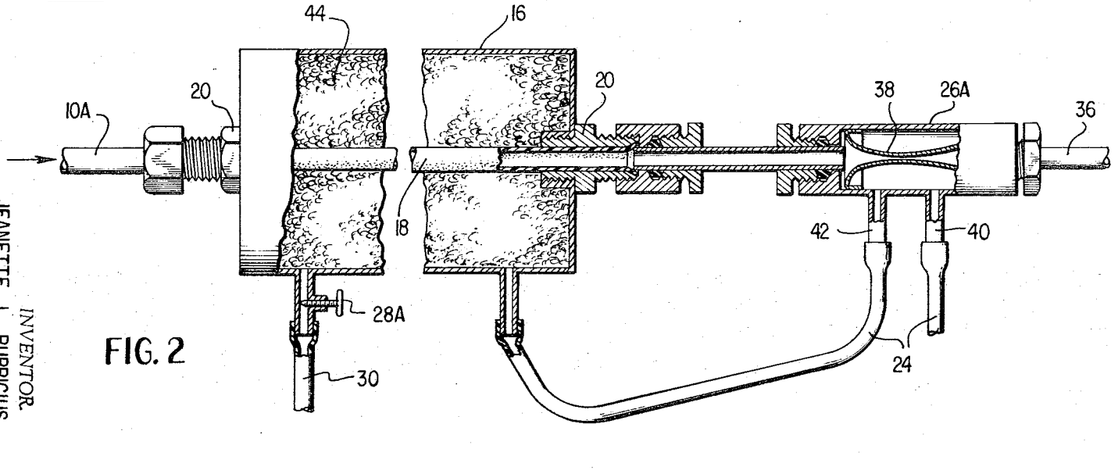
FIG. 2 is an elevational view, principally in section and to an enlarged scale, of an oxygenator which may be used as part of the apparatus of FIG. 1.

Oxygenator 14 is shown in greater detail in FIG. 2. A cylindrical tank or chamber 16 is provided, which may be fabricated from stainless steel. A section of porous tubing 18 which is permeable to gas but not to fluid is secured along the tank axis by means of the fittings 20 which are a gas-tight fit into the threaded openings in the tank end walls. Sintered polyethylene is one suitable material for tubing 18.

Oxygen under pressure from tank 22 passes through the tubing 24 into the oxygenator tank at a rate which is controlled by inlet valve 26 shown in FIG. 1. Pressure within the oxygenator is maintained at a level suitable to completely oxygenate the blood; usually between two and three atmospheres. This pressure level is established by means of the relative settings of inlet valve 26 and an outlet valve 28 which is located in the exhaust tubing line 30.

The settings of valves 26 and 28 may be controlled by means of a servo mechanism 31 which, together with its reference source 32 and a control signal developed by an electrical oxygen level detector 34 of $O_2$ pickoff device, regulates the valves in accordance with the oxygen level in the treated blood which is returned to the patient via tubing 36. The servo controlled operation of the blood oxygenator will be described in greater detail hereinafter.

Returning to FIG. 2, a manual control of the oxygenation rate and level will be first described in order that the invention may be readily understood. Oxygen from the tank source 22 is admitted into the oxygenator cylinder 16 by way of tubing 24, shown at the right in the figure. Blood flow is from the left, as indicated by the arrow, and the fluid pressure of the blood is kept at a high level so that the oxygen surrounding the permeable tubing 18 may be raised to above atmospheric pressure levels without direct flow of the gas into the blood fluid.

This is accomplished by relating the fluid pressure of the blood which is established by the pump 12 to the oxygen pressure. In FIG. 2, the inlet valve 26A is in the form of a pressure lock which maintains the blood fluid pressure at a level which is higher than the oxygen pressure, to thereby avoid the direct passage of gaseous oxygen into the blood. Valve 26A contains a distendable balloon member 38 which may be fashioned of a thin silicone rubber. This balloon member may be a spherical, sausage-shaped, or toroidal hollow body which upon distention under pressure from the incoming oxygen will expand so as to completely occlude the flow of blood through the oxygenator. Oxygen is admitted into the balloon body 38 within the pressure lock by the opening 40 in the body of valve 26A and passes out the opening 42 via tubing 24 into the oxygenator cylinder 16. The differential pressure between the pressure lock and the oxygen pressure within cylinder 16 is controlled by the needle valve 28A in the exhaust tubing line 30.

As further illustrated in FIG. 2, particles 44 of soda lime or any other suitable agent are provided within the oxygenator for the purpose of absorbing carbon dioxide to simulate the lung action and promote the conversion of the reduced hemoglobin of the deoxygenated blood into oxyhemoglobin in the oxygenated blood which is returned to the patient by the tubing 36.

In operation of the oxygenator gaseous oxygen immediately diffuses into the blood to rapidly oxygenate it. By controlling the exposure time of the blood to the oxygen, the solution of more oxygen than the blood can hold at atmospheric pressure may be prevented. In other words, the blood is exposed to the high pressure oxygen for just sufficient time to fully convert the hemoglobin to oxyhemoglobin.

An oxygen sensing device, such as polarographic electrode, may be installed at the downstream side of the oxygen saturation chamber as indicated by reference number 34 in FIG. 1. When the blood is fully oxygenated, the oxygen pressure can then be reduced by means of the servo mechanism 31. In actual practice this is a continuous operation. The blood is fed into the oxygenator 14 at a predetermined rate by pump 12 and passes on out via tubing 36. Oxygen pressure is controlled within the cylinder by the servo actuation of valves 26 and 28.

Figure 3:
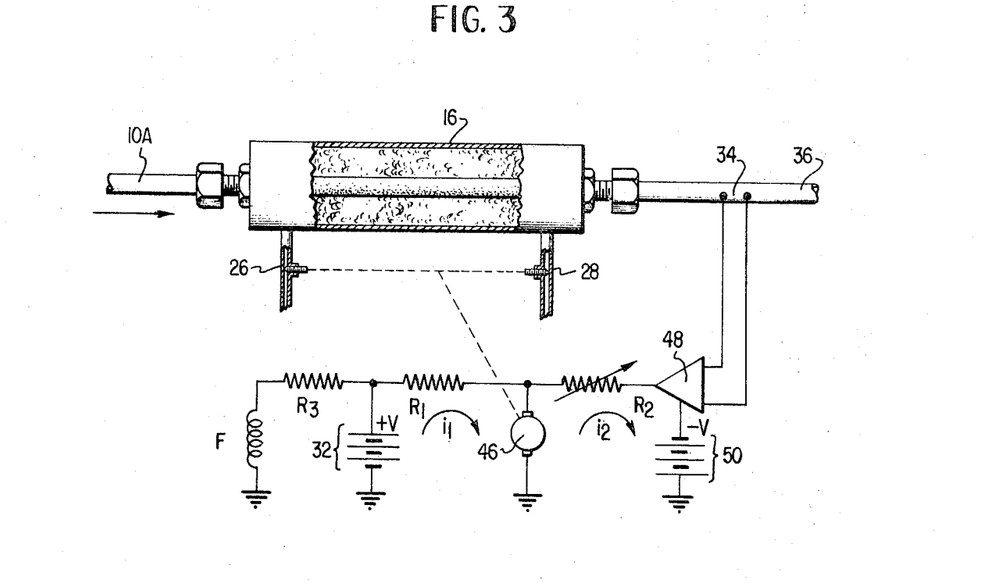
FIG. 3 illustrates blood oxygenation apparatus of the type shown in FIG. 1, and includes a schematic diagram of the electrical servo motor system.

The oxygenator is shown in FIG. 3 with the electrical details of one form of a suitable servo system which may be used to control the oxygen pressure in the chamber 16. The oxygen level in the blood coming from the oxygenator is sensed or detected by means of a pair of polarographic electrodes 34 which are inserted into the tubing 36. The detected potential from electrodes 34 is amplified by means of servo amplifier 48 so as to control the movement of a servo motor 46 which actuates valves 26 and 28.

Current $i_2$ flows through motor 46, resistor $R_2$, and the output load circuit of amplifier 48 from the negative-poled voltage source 50 which energizes the amplifier, in accordance with the magnitude of the input signal to the amplifier from the oxygen detecting electrodes 34. Current $i_2$ causes the drive shaft of motor 46 to turn in a first direction.

Current $i_1$ flows through motor 46, the positive-poled reference voltage source 32, and resistor $R_1$ in accordance with the value of resistance of $R_1$. Current $i_1$ is opposite to the current $i_2$, and causes the drive shaft of motor 46 to turn in the opposite direction. When curernts $i_1$ and $i_2$ are equal in magnitude, since they are opposite in sign, the motor will not rotate, and valves 26 and 28 will not turn.

Valves 26 and 28 are threaded needle valves which are arranged such that rotation by motor 46 in a given direction will simultaneously close one and open the other of the valves. The servo loop mechanism is initially adjusted with inlet valve 26 partially open and outlet valve 28 partially closed so that a pressure of two or three atmospheres of oxygen is maintained within the cylinder 16. This produces the desired oxygen tension as measured by the detector electrodes 34, and the variable resistor $R_2$ is set to a valve such that the motor 46 does not rotate; i.e., $i_1 = i_2$. When the oxygen level in the treated blood decreases, the detected potential from electrodes 34 changes in a direction such that $i_2$ increases causing the motor to turn in a first direction which continues until the valves supply more oxygen to the cylindrical chamber and thus restore the oxygen tension to the blood. Should the oxygen tension in the blood become too high, a reverse servo action takes place; the current $i_2$ decreases and thus the constant current $i_1$ is greater than $i_2$ and causes the motor to turn in the opposite direction to reduce the pressure within the oxygenator.

It will be apparent that when current $i_2$ exceeds $i_1$ the ungrounded terminal of motor 46 at the junction of resistors $R_1$ and $R_2$ will have a resultant negative voltage applied thereto and the motor will turn in a first direction. When the magnitude of current $i_1$ exceeds that of $i_2$, a resultant positive voltage will be applied to such motor terminal. When the currents are equal in magnitude, the motor will not turn. The field, F, of motor 46 is energized from the reference voltage source 32 by means of a suitable current limiting resistor $R_3$.

Although the system of FIGS. 1–3 functions adequately and allows for oxygenation of blood at rapid rates, it has the disadvantage that safeguards must be used to prevent gas from directly entering the blood and causing embolization in the patient.

Direct chemical oxygenation of the blood being transported by the pump is more rapidly controllable than the pressurized oxygenators 14–16 of FIGS. 1–3, and the danger of embolization is obviated. In this system, illustrated in FIG. 4, hydrogen peroxide from a container 52 is delivered into the stream of blood which is flowing through a length of tubing 36A, which, as before, may be fed by any suitable pump means, not shown. Within container 52 is a collapsible plastic bag 54 which holds the hydrogen peroxide solution. Bag 54 is inverted within the container 52 whose walls serve to support such bag as its contents are depleted. Outlet 56 from the bag is connected to a metering pump 58, here shown as a gear pump, whose fluid contacting elements are preferably formed of plastic. Other types of pump means may be utilized at element 58, for example, a peristaltic type of tubing pump is also satisfactory.

Figure 4:
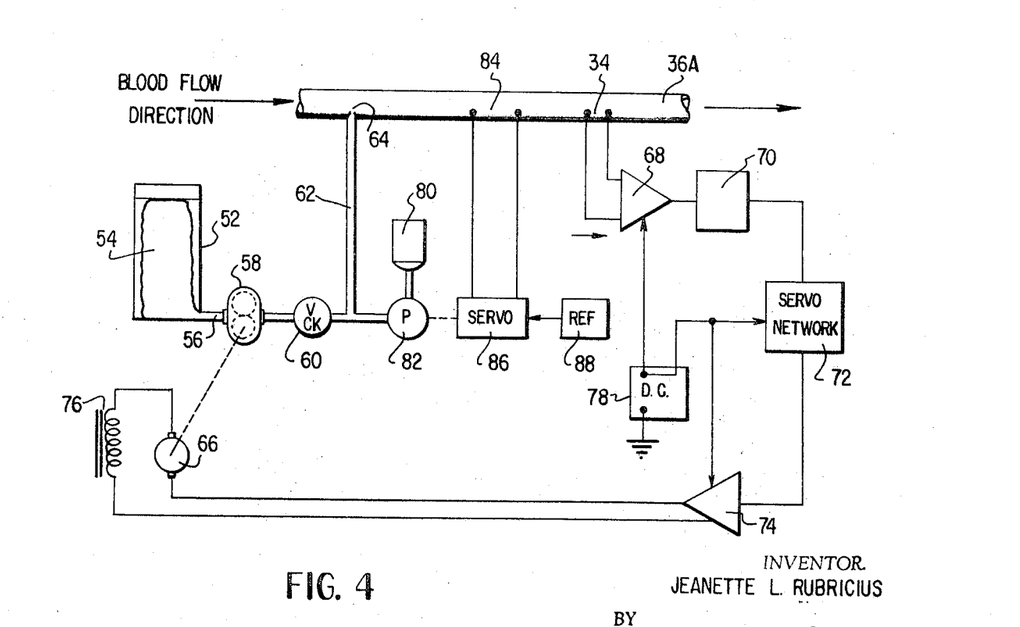
FIG. 4 represents a further embodiment of the invention wherein a buffer solution may be added to the blood while it is oxygenated.

Hydrogen peroxide solution is delivered by the pump 58 through a check valve 60 and the tubing 62 at a rapid rate through a fine orifice 64 so that adequate mixing takes place with the blood flowing in tubing 36A.

Blood contains an enzyme called catalase which causes the immediate decomposition of hydrogen peroxide into gaseous oxygen and water. The oxygen immediately converts the reduced hemoglobin to oxyhemoglobin so that free bubbles of oxygen are not formed. To control the proper amount of hydrogen peroxide to add to the flowing blood, polarographic oxygen sensor electrodes 34 are placed in the downstream side of the flowing blood. The voltage developed by electrodes 34 controls the servo motor which drives metering pump 58 for injecting the hydrogen peroxide.

FIG. 4 illustrates a different servo system which may be used to control the servo motor 66. The oxygen pickoff electrodes 34 produce an AC signal which is suitably amplified in the AC amplifier 68, demodulated by the block element 70, and is then fed as a DC control signal into a servo network represented by the block element 72.

Servo motor 66 which turns the metering pump is arranged for rotation in one direction only, which is the direction which forces the hydrogen peroxide solution from the bag 54 out through orifice 64. In the preferred embodiment motor 66 is a universal DC motor having the series-connected field winding 76, and is therefore connected to be energized by a DC amplifier 74 as the output load for such amplifier. The input error control signal for amplifier 74 is derived from the servo network 72.

Network 72 may be any suitable servo network which will include the necessary elements of a reference source, means to compare the level of the sensor voltage developed by the electrodes 34 and modified by the amplifier 68 and detector 70 with a voltage from such reference source, and means to derive a differential error signal output as the sensor voltage varies from a predetermined level. Such networks are known in the art, and any suitable one may be used in practicing the invention.

For example, the servo network 72 may utilize the DC potential supply 78 which energizes the amplifiers 68 and 74 as a reference source. By means of a variable element within the servo network 72, which element may include a manually adjustable dial calibrated in oxygen tension, oxyhemoglobin units, etc., the error signal output from 72 is set to such a level that motor 66 ceases to rotate and is at rest. This is the desired predetermined level at which the oxygen tension in the treated blood is at the required level. When the oxygen tension decreases, as indicated by a change in the level of sensor voltage developed by electrodes 34, the output current from amplifier 74 increases, causing motor 66 to rotate and thus inject hydrogen peroxide into the flowing blood. Motor 66 continues to drive the metering pump until the servo loop reduces the differential error signal to a value which indicates that the desired oxygen tension has been restored. If the oxygen pressure becomes too high, the motor drive current from amplifier 74 is reduced, causing motor 66 to stop rotation.

One function of the lungs is to remove carbon dioxide, and reduced hemoglobin is converted to oxyhemoglobin more readily in an acid environment. To obviate the need for a respiratory carbon dioxide exchange, the hydrogen peroxide solution in bag 54 may be mixed with a buffering solution such as tris or triple (hydroxymethyl) aminomethane, hereinafter referred to as tris amino buffer, which neutralizes the carbon dioxide and makes possible the excretion of $CO_2$ via renal pathways, passing through the kidneys into the urine, rather than through the respiratory route. Preferably tris amino buffer can be mixed with the hydrogen peroxide solution which is contained within the bag 54 directly in a proportion which is readily calculated such that for each mole of oxygen utilized, 0.8 mole of carbon dioxide is evolved.

The tris amino buffer may be separately added rather than being included with the hydrogen peroxide solution, and the amount added may thus be separately controlled by sensing the pH downstream from the injection area. This is shown in FIG. 4, wherein a separate tank 80 is provided to contain the tris amino buffer. The buffering solution is fed from tank 80 by a metering pump 82 through the tubing 62 into the orifice 64. It may be desirable to include the check valve 60 shown, so that the added buffering solution will emerge only from orifice 64 to mix with the blood under treatment and not flow back into pump 58 and possibly through it into bag 54. Also, a further check valve, not shown, may be inserted between pump 82 and the tubing 64 if necessary to assure that all of the hydrogen peroxide passes out of orifice 62 when the buffering solution is separately added.

By separately adding the tris amino buffer from tank 80 the metering pump 82 can be readily servo controlled by means of pH sensor electrodes 74 inserted downstream of mixing orifice 64. The signal detected by electrodes 84 feeds a servo mechanism 86 which, together with its reference source 88, controls the operation of the feed pump 82 in the same manner as has been described for the servo control of the pump 58.

A very small percentage of patients do not have the enzyme catalase, and the introduction of hydrogen peroxide into the blood of such patients would be dangerous. The catalase can therefore be added directly to the patient's blood in such cases, or the oxygenation system of FIG. 4 may be abandoned in favor of one of the systems of FIGS. 1–3 or 5. Patients who cannot tolerate the direct introduction of hydrogen peroxide constitute less than one percent of the population, and are readily identified by mixing the blood of the patient with hydrogen peroxide and observing foaming. Patients without catalase do not foam the blood as do normal people.

A third method of bringing the oxygen directly to the blood is to inject a saline solution containing a large quantity of dissolved oxygen such as would occur when these solutions are exposed to oxygen under pressures of approximately 1000 pounds per square inch. The amount of oxygenated saline solutions, or a 6% dextran solution in saline, or a 5–10% glucose solution in saline, for example, which is metered into the blood is controlled in a manner similar to the servo-controlled pump 58 shown in FIG. 4. Instead of a pump, a servo-controlled needle valve may be used, which valve is to be closed when the oxygen tension rises to a predetermined saturation of 130 mm. of mercury oxygen tension, for example.

Figure 5:
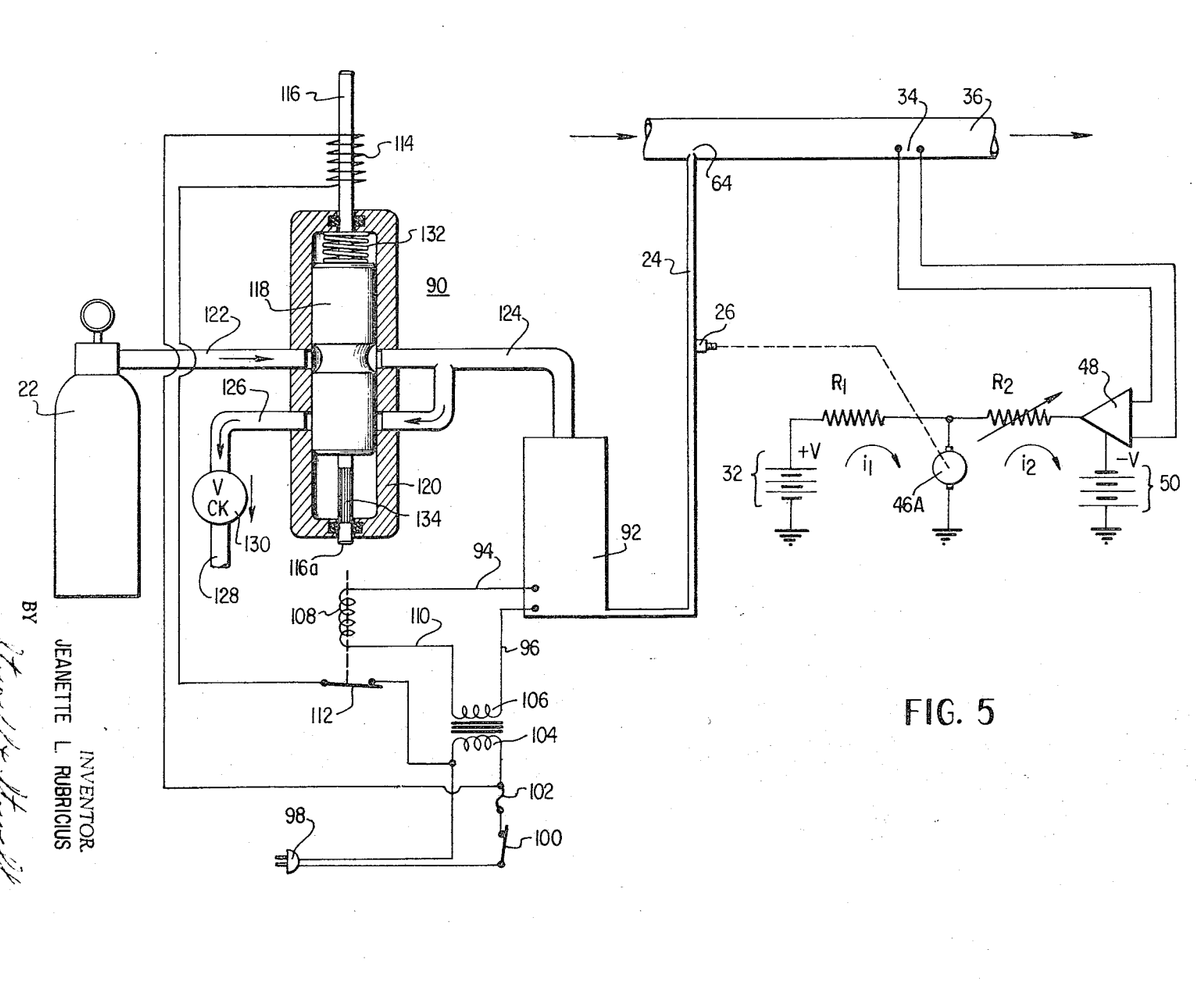
FIG. 5 shows another embodiment of a blood oxygenator which utilizes oxygen dissolved in a fluid.

Such an arrangement for blood oxygenation is shown in FIG. 5. A needle valve 26 is arranged to be driven by the servo motor 46A. Motor 46A is similar to the motor 46 used in the embodiment shown in FIG. 3; however, to illustrate a further possible variation in the type of servo mechanism which may be utilized in practicing the invention, motor 46A is represented as a DC motor having a permanent magnet field structure. Thus the reference numerals and characters used in FIGS. 3 and 4 have been applied to designate like elements in FIG. 5.

Tank 22 supplies high pressure oxygen through a solenoid valve assembly 90 to a solution of glucose and saline maintained within a fluid storage tank 92. Such solution may be cooled in order to increase the quantity of dissolved oxygen which it will retain. At or near the bottom of storage tank 92 a pair of conductors 94 and 96 are passed through any suitable hermetically sealed insulating means mounted in the tank wall. The free ends of conductors 94 and 96 are thus placed in contact with the interior of tank 92. Such ends serve as conductivity electrodes to detect the presence of the saline solution within the fluid storage tank.

The conductivity electrodes together with the solenoid valve assembly 90 and its associated circuitry act as a safety device to shut off the flow of high pressure oxygen should the saline solution level within tank 92 drop too low, thus preventing the possibility of the introduction of high pressure oxygen directly through the tubing 24 into the blood which is passing through tubing 36.

When there is a sufficient level of fluid within tank 92, a circuit is completed between conductors 94 and 96 due to the conductivity of the saline solution. Line voltage, nominally 117 volts AC, is applied by means of the plug 98, switch 100, and fuse 102 to energize the primary winding 104 of a voltage step-down transformer. Low voltage from one end of the transformer secondary winding 106 is applied to conductor 96; passes through the fluid conductivity path to conductor 94; thence through the safety relay winding 108; and returns to the other end of winding 106 via conductor 110.

Relay winding 108, when energized by the low voltage AC, closes a normally open single-pole contact 112 which applies line voltage to solenoid winding 114 of the valve assembly 90. Energization of winding 114 draws the valve armature 116 together with the attached bobbin valve member 118 upward within the body of valve assembly 90 to the position shown in FIG. 5.

Valve body 120 is illustrated in section. When the solenoid winding 114 is energized as shown, the central relieved portion of the bobbin valve member 118 connects the high pressure oxygen supply line 122 to the inlet line 124 of fluid storage tank 92. When winding 114 is de-energized, the valve spring 132 acting together with the force of gravity drops the bobbin valve member 118 to the bottom of the valve assembly. The dropped bobbin seals off the oxygen flow from supply line 122, and connects the inlet line 124 of tank 92 to a valve outlet line 126 which leads to an atmospheric exhaust line 128 through an intervening check valve 130.

Exhaust line 128 may advantageously be connected to an exhaust hood or fan system, or to a point remote from the oxygenation apparatus so as to preclude the possibility of an explosive mixture of oxygen should the bobbin drop and thus vent the pressure within tank 92.

It will be noted that either too low a fluid level within tank 92, or a failure of either the high or low voltage circuits, will cause the bobbin to drop as a "fail safe" measure. The armature 116 is located axially of the bobbin 118 and supports the same, and may have a lower rod portion 116A which serves to guide and maintain the bobbin valve element in alignment within the valve body 120. Suitable seals may be provided where elements 116 and 116A pass through the body 120. When the lower rod portion 116A is provided, a normally concealed area 134 thereof may be painted red, as lined in the drawing, to serve as a visual tell-tale warning of actuation of the shut-off valve.

The oxygen-bearing glucose and saline solution is mixed into the flowing blood by the orifice 64. Downstream thereof an oxygen tension detector 34 of the polarographic type previously described provides a control signal for the servo motor 46A which is indicative of the oxygen level of the treated blood.

Variable resistor $R_2$ is set to a value such that when the detected oxygen level is that which is desired motor 46A will not rotate. Upon a decrease in detected oxygen tension current $i_2$ from amplifier 48 overbalances current $i_1$ from the reference source 32, and motor 46A turns in a direction to open inlet valve 26. As in the servo control system utilized in FIG. 3, if the detected oxygen tension becomes too large the reverse action takes place; $i_2$ decreases and $i_1$ drives motor 46A in the opposite direction so as to close needle valve 26.

Figure 6:
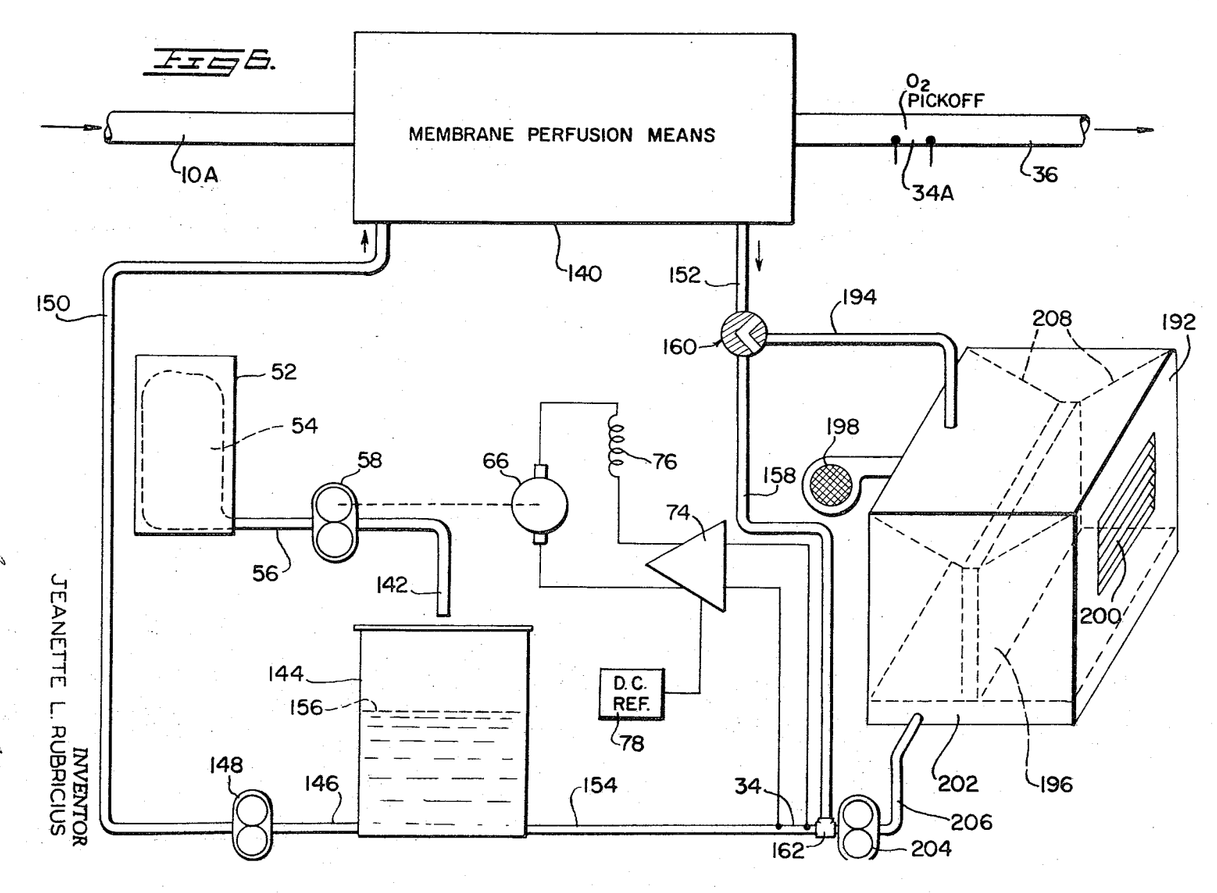
FIG. 6 illustrates an alternative embodiment of the invention wherein oxygenation is accomplished with membrane perfusion means and a hydrogen peroxide perfusion fluid.

A fourth and preferred technique for the oxygenation of blood is shown in FIG. 6. A method and apparatus are illustrated wherein hydrogen peroxide is diffused into the blood through membrane means; the blood under treatment is circulated in a closed system over one surface of a perfusion membrane, and the perfusion fluid is passed over the other membrane surface with no direct contact between the perfusate and the blood. A controlled amount of hydrogen peroxide is metered into the perfusate by servo means controlled by one or more oxygen sensing devices.

Difficulties which may be encountered in introducing hydrogen peroxide directly into the blood can be overcome by allowing the hydrogen peroxide to diffuse into the blood across a membrane. This allows for slow introduction with complete mixing. A somewhat similar technique is used in the so-called artificial kidney to dialyze out harmful waste products which accumulate in the blood. Diffusion methods have also been applied to prior art oxygenators, using a membrane of gas permeable material to separate the blood from the surrounding atmosphere of oxygen. This type of oxygenator has the advantage of not exposing the blood to a gas interface which causes hemolysis and is a serious drawback to oxygenators which film blood in the presence of air or an oxygen rich environment. However, the gaseous diffusion of oxygen is slow, and the prior oxygenators are relatively inefficient, making the use of oxygenators using gas liquid interfaces almost mandatory. The bubble oxygenator and the disc oxygenator in common use are examples of oxygenators employing gas liquid interfaces. Also, oxygen is a relatively lipid soluble gas, and therefore only a non-polar type of membrane is permeable to oxygen. Carbon dioxide on the other hand diffuses best through a polar type of membrane; reaching very rapid equilibration on both sides of a membrane such as cellophane.

Hydrogen peroxide can be rapidly diffused across a polar type of membrane with equilibration occurring almost immediately. The diffusion of hydrogen peroxide across a cellophane or similar cellulose membrane makes it unnecessary to inject hydrogen peroxide directly into the blood stream. Mixing is excellent. If the hydrogen peroxide perfusion fluid has the proper colloidal osmotic pressure no water will be transferred to the blood in the process of equilibrium. This can be accomplished by adding the hydrogen peroxide to a perfusing solution containing dextran or polyvinyl pyrolidine and the required electrolytes. Carbon dioxide can be removed from the perfusion fluid by chemical means such as soda lime, or by aeration.

In the apparatus of FIG. 6 hydrogen peroxide is metered into a perfusion fluid which is separated from blood by a membrane. It is therefore no longer necessary to measure the oxygen tension of the treated blood directly, for one may derive a signal for controlling the rate of metering of the hydrogen peroxide from the redox potential of the perfusion fluid. Blood oxygenation can be checked by spectrometric methods for safeguards or this can be done polarigraphically. An amount of hydrogen peroxide is proportionally metered into the perfusion fluid depending on the redox potential; the metering rate being rapid when the potential is low and ceasing when the rate of oxydation reduction potential is high. The amount of perfusion fluid is kept at a minimum volume to insure against adding more hydrogen peroxide than can be taken up by the blood. To insure a rapid response time, the perfusion fluid is circulated at high velocity, while the blood moves through the device at a relatively slow rate.

The apparatus of FIG. 6 may be considered as a modification of the oxygenator illustrated in FIG. 4, and like reference numerals are utilized to designate common elements. Deoxygenated blood from the patient enters membrane perfusion means 140 through tubing 10A from the left, and is returned via tubing 36, as indicated by the arrows. A positive displacement pump, such as the pump 12 of FIG. 1, may be employed to maintain blood flow through the apparatus.

A collapsible plastic bag 54 holds the hydrogen peroxide oxygenating medium, which may be, for example, a thirty percent $H_2O_2$ solution. Bag 54 is inverted within a rigid walled container 52 whose walls support such bag as its contents are depleted. Bag outlet 56 is connected to a metering pump 58, as previously described in connection with the FIG. 4 form of the invention.

Hydrogen peroxide solution is delivered by the pump 58 under the control of servo motor 64 via tube 142 into reservoir 144 in which is maintained a suitable level of the perfusing fluid 156. Such fluid may be an electrolyte solution, such as a dextran-saline or polyvinyl pyrolidine-saline solution.

The perfusion fluid is drawn from reservoir 144 via outlet tube 146 by a pump 148, and is passed through perfusion means 140 by way of the perfusion fluid inlet and outlet tubing elements 150 and 152, respectively. After passage through the membrane perfusion means, fluid 156 is returned to reservoir 144 through tubing 154.

Located within the perfusion fluid return tubing 154 are a pair of polarographic electrodes 34 which sense the oxygen/reduction or redox level in the returned $H_2O_2$ perfusion solution. The control potential derived from these sensing electrodes is used to control the metering pump 58 to add hydrogen peroxide in a known manner by the servo motor 66 which is actuated by the output current from the servo amplifier 74.

Figure 7:
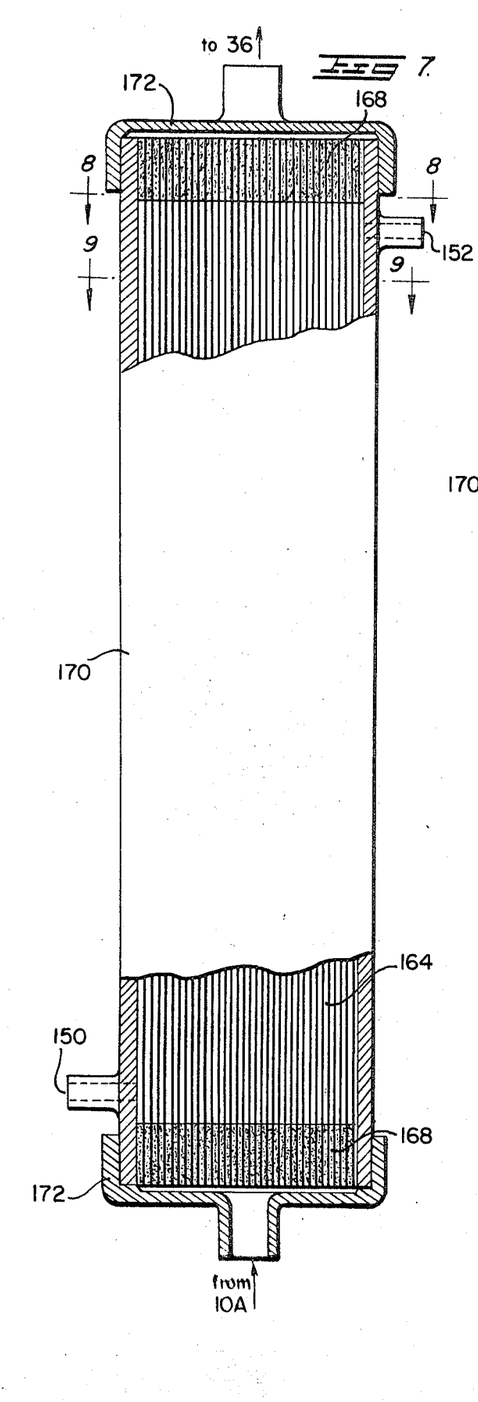
FIGS. 7, 8 and 9 show, in section and to an enlarged scale, one form of membrane perfusion means which may be incorporated in the apparatus of FIG. 6.
Figure 8:
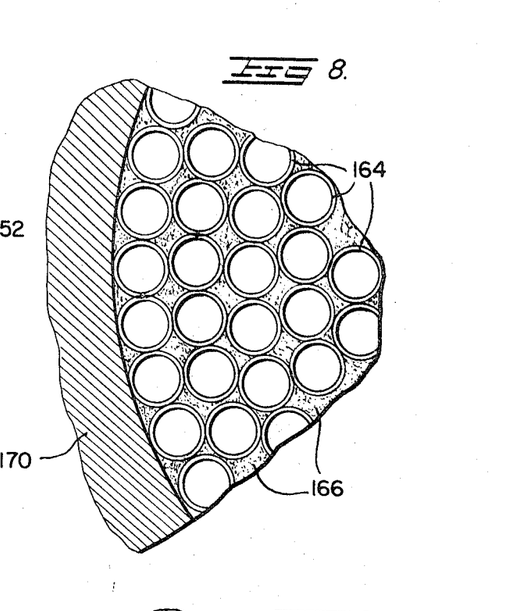
Figure 9:
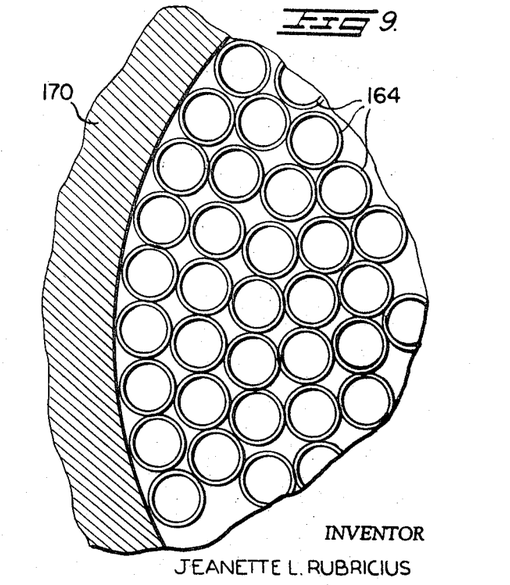

The membrane perfusion means 140 of FIG. 4 may vary in structure, and one suitable type of membrane exchanger and the preferred method of its manufacture is illustrated in FIGS. 7, 8 and 9.

Referring to FIG. 7, the membrane exchange medium consists of cellulosic material. A plurality of small diameter cellophane dialysis tubes 164, each of approximately one millimeter diameter, are assembled in a bundle in edge abutting relationship, as shown in detail in the enlarged fragmentary sectional view of FIG. 9.

A cylindrical bundle consisting of many tubes 164 arranged in parallel abutment is assembled and secured together by means of a semi-rigid plastic casting or potting substance 166, for example one of the urethane plastic compounds, so as to form upper and lower collars 168. After the casting step the plastic substance is trimmed in a plane transverse to the axes of the cellulosic tubes to produce a liquid tight collar wherein the small orifices of the tubing are held open by the plastic which surrounds and supports the tubes about their outer peripheral surface. See FIG. 8.

The resulting cylindrical bundle of loose cellophane tubing supported between the two semi-rigid collars is inserted into and surrounded by a cylindrical jacket 170. The collars 168 are secured in any known manner to the inner wall surface of jacket 170 in a liquid tight fashion.

End caps 172 complete the perfusion chamber. The blood to be treated is circulated through the interior of the tubes via the axial openings of the end caps 172, while the perfusion fluid with which the blood equilibrates is circulated over the outer surface of the tubes within the jacket by way of the fluid inlet and outlet elements 150 and 152 which are suitably secured to the outer jacket wall.

Figure 10:
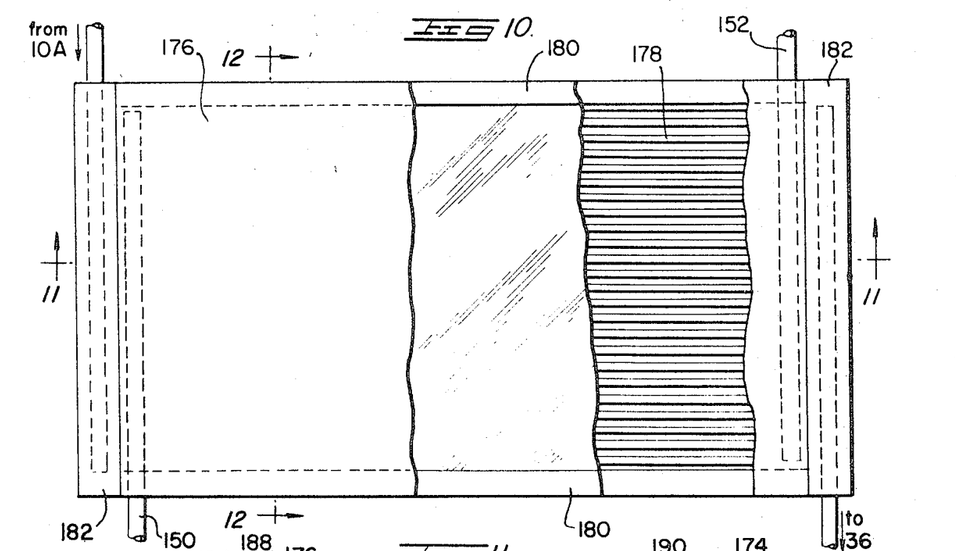
FIGS. 10, 11 and 12 show, in plan and section, another type of membrane perfusion means suitable for use as part of the apparatus of FIG. 6.
Figure 11:
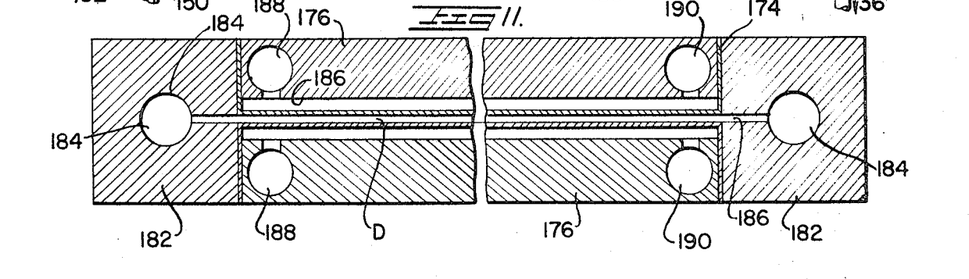
Figure 12:
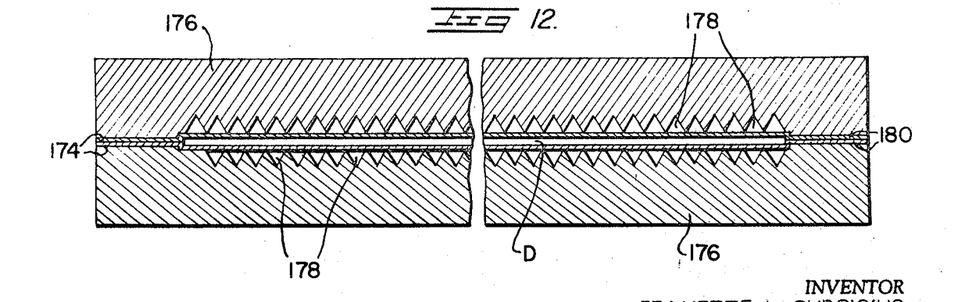

An alternative type of membrane perfusion means 140 is illustrated in FIGS. 10, 11 and 12.

In this form of the apparatus sheets of cellulosic material 174 provide the membrane exchange surface. A flat sheet of cellophane is secured in a parallel arrangement so as to overlie the inner surface of each of a pair of rigid rectangular blocks 176. The inner surface of each block 176 is provided with a plurality of parallel and edge-abutting V-shaped grooves 178 which are formed in any convenient manner, such as by casting, milling or routing techniques. Grooves 178 run in a longitudinal direction from end to end of block 176; that is, in a direction from left-to-right as viewed in FIG. 10; and occupy the major portion of the inner surface area. A smooth uninterrupted raised edge band 180 is provided along the outer length of each block.

As evident in the enlarged sectional view of FIG. 12, the edge bands of blocks 176 serve to clamp a pair of flat cellophane sheets 174 in parallel spaced apart relationship, which in a preferred embodiment of the invention results in an inner spacing D of substantially one thirty-second of an inch between the membrane sheets.

A pair of complementary blocks 182 of substantially square cross-section are arranged to close off the open edges of the assembly consisting of the two rectangular blocks 176 and the two cellulosic sheets 174.

Blocks 182 serve to secure the "sandwich" assembly 176–174–174–176 into a rigid liquid tight perfusion chamber. Suitable clamping and securing means, not shown, may be employed to hold the elements 182 and 176 together. Referring to FIG. 11 it will be noted that the cellophane sheets 174 extend beyond the inner surface of the blocks 176 and are clamped between the inner edge of each block 182 in a liquid tight fashion. Suitable gaskets or gasketing compounds, not shown, may be utilized to obtain a liquid tight seal.

Each block 182 is provided with a passage or gallery 184 to be connected to the blood undergoing treatment which will enter the perfusion means through tubing 10A and is recirculated via tubing 36, as previously indicated in FIG. 6. Gallery 184 opens into a slot 186 having a dimension equal to or greater than the membrane spacing distance D, so that the blood under treatment travels through a central chamber whose boundaries are formed by the inner surfaces of the spaced cellulosic membrane sheets 174.

The perfusion fluid 156 with which the blood comes into equilibrium with respect to dializable crystalloids circulates over the outer surfaces of the membrane sheets 174 over a path which is formed by the plurality of V-shaped grooves 178. Galleries 188 are provided in the rectangular blocks 174 to conduct the perfusion fluid from the inlet tubing element 150 into the perfusion means of FIG. 10, while similar galleries 190 serve to return the fluid after its passage over the outer membrane surfaces to the outlet tubing element 152.

The small passage dimension D within the membrane perfusion means 140 illustrated in FIG. 10 promotes filming of the blood so that the surface exposed to dialysis is a maximum.

Many patients suffer from deoxygenation of the blood in the post-operative period. This is due to a failure of the blood to reach air sacs containing oxygen. Some of the blood must pass through regions of the lungs where the lung is collapsed and unaerated. These disturbances are referred to as disturbances in the ventilation/perfusion relationship where ventilation refers to the process of filling the air sacs with inspired air and perfusion refers to perfusing ventilated areas with blood. Some of these patients have large ventilatory volumes and hence the quantity of blood which perfuses through the ventilated areas must be reduced. The situation is commonly referred to as shunting of the blood back to the systemic circulation in a manner which bypasses the ventilated areas of the lung. These patients often have no serious problem in ridding themselves of carbon dioxide but do not oxygenate their blood properly. In such cases, the oxygenator can serve as an artificial lung. Blood is removed from a large vein, passed through the oxygenator, and returned to the venous system. By this device, the partial pressure of oxygen in mixed venous blood can be elevated from such low levels as 30 mm. Hg to levels of 70 mm. Hg. If no further oxygenation occurred in the lungs, the arterial oxygen saturation would be 70 mm. Hg which is compatible with life. Hence, the oxygenation can be used to support a patient over a temporary period of pulmonary dysfunction.

For patients of the above-noted type wherein oxygenation alone is required, the apparatus of FIG. 6 would be operated so that the perfusion fluid 156 flowing from the outlet tubing 152 of the perfusion means 140 is returned directly to reservoir 144 via tube 158. Such oxygenation operation is achieved by positioning the valve means 160 to connect tube 152 to tube 158.

When the patient requires complete heart and lung bypass, carbon dioxide must be removed from the perfusion fluid. This is done by means of the aeration chamber 192 shown in FIG. 6. Perfusion fluid 156 flowing from outlet tubing 152 will contain absorbed carbon dioxide. Such fluid is directed through tube 194 by manipulation of the valve means 160 to disconnect tube 152 from tube 158 and to connect it to tube 194.

The perfusion fluid is sprayed into the interior of the enclosed aeration chamber by any suitable nozzle means, not shown, located at the end of tube 194. Within the aeration enclosure sloping baffle plates 208 conduct the fluid so that it flows downwardly over and through a fibrous pad 196. Pad 196 may be formed of glass fiber or urethane foam material. A blower 198 forces air through pad 196 at a high volume rate so as to remove the carbon dioxide from the perfusion fluid. The air exits from the louvered opening 200.

The carbon dioxide free perfusion fluid collects in sump 202 at the bottom of chamber 192 from whence it is returned to reservoir 144 by means of the pump, tube 206, T junction 162 and tube 154.

The oxygenation level of the blood returned to the patient, and/or the carbon dioxide content thereof, may be monitored by means of the pickoff electrodes 34A located in the tube 36 of FIG. 6.

While the foregoing description sets forth in detail the present and preferred forms of the several embodiments of blood oxygenation apparatus, it will be apparent to those skilled in the art that, in practice, various modifications may be made without departing from the spirit and scope of the invention as defined in the appended claims. For example, the oxygen tension sensor element has been described as a polarographic electrode device; however, other devices capable of sensing oxygen saturation may be used. In place of the Severinghouse electrodes one could utilize a photosensitive sensor; determining the amount of oxygenation as indicated by the increase of brightness of the red coloration of the blood as the hemoglobin combines with the oxygen to become oxyhemoglobin. Further, as described in connection with FIG. 4 wherein a buffering solution is separately added to the flowing blood under treatment, additions of supplemental blood, blood expanders, plasma or serum, to the flowing blood from a separate reservoir with or without the introduction of medicinal or nutritional agents, such as anticoagulants, vitamins, glucose, hormones, etc., may be made. This separate addition may be made as provided for in the embodiment of FIG. 4, or more generally by the introduction of the additional agent at the location indicated by the dashed-line block element 136 in FIG. 1; and as in FIG. 4, such addition may be servo controlled.

From the foregoing description it will be readily apparent that several embodiments of oxygenation apparatus have been produced which fulfill the objects of the invention. By utilizing the apparatus of the invention, blood may be readily oxygenated as it passes through a circular tube without trauma to the blood such as is caused in the prior art mechanical oxygenators by filming and bubbling. All of such known oxygenators have the disadvantage of producing a high percentage of hemolysis in the oxygenated blood. The method of the present invention does not subject the blood to mechanical trauma, and is therefore free of these disadvantages. In addition, platelets which are removed by the usual mechanical oxygenators are not disturbed, and bleeding tendencies therefore do not develop in the patients. Less heparin is required and the blood is not defibrinated as happens in the usual patient.

I claim:

1. Apparatus for oxygenating blood comprising in combination, means to pass blood of reduced hemoglobin content through a membrane perfusion means; a perfusate fluid including at least hydrogen peroxide; said membrane perfusion means including a plurality of membrane surfaces separating the blood from the said perfusate fluid, means to pass the blood in contact with one side of said membrane surface, means to circulate said perfusate fluid in contact with the opposite side of said membrane surface, a perfusate fluid reservoir means from which said perfusate fluid is circulated to and returned from said membrane perfusion means whereby said hydrogen peroxide in said perfusate fluid is diffused through said membrane perfusion means into the blood, and servo control means to meter the hydrogen peroxide into said perfusate fluid.

2. Apparatus for oxygenating blood as set forth in claim 1 wherein said membrane surfaces comprise planar sheets of cellulosic material.

3. Apparatus for oxygenating blood as set forth in claim 1 wherein said membrane surfaces comprise a bundle of tubes of cellulosic material, and said perfusion means includes a chamber surrounding said tubes having means to pass said blood axially through the interior of said tubes and to circulate said perfusate fluid about the outer surfaces of said tubes.

4. Apparatus according to claim 2 wherein the plurality of said membrane surfaces are so dimensioned and spaced apart, one from another, that the blood under treatment passes as a film in contact with said surfaces.

5. Apparatus according to claim 3 wherein said tubes of cellulosic material are so dimensioned that the blood under treatment passes as a film in contact with the interior surfaces of the tube.

6. Apparatus for oxygenating blood as set forth in claim 1 further including a perfusate fluid reservoir, and said servo control means includes apparatus to sense the redox level in the perfusion fluid after said fluid is circulated through the membrane perfusion means and to meter said hydrogen peroxide into the fluid reservoir in accordance with such sensed redox level.

7. Apparatus for oxygenating blood comprising, in combination, means to pass blood of reduced hemoglobin content through a membrane perfusion means; said means including a plurality of membrane surfaces separating the blood from the perfusate fluid, means to pass the blood in contact with one side of said membrane surface, means to circulate said perfusate fluid in contact with the opposite side of said membrane surface, servo control means to meter an oxygenating agent into said perfusate fluid, a perfusate fluid reservoir from which said perfusate fluid is circulated to and returned from said membrane perfusion means, and apparatus for the removal of carbon dioxide from the returned perfusate fluid is located between said perfusion means and said reservoir, with means to selectively pass the returned perfusate fluid through said carbon dioxide removal apparatus.

References Cited

UNITED STATES PATENTS

| | | |
|---|---|---|
| 2,792,002 | 5/1957 | Malmros et al. _______ 23—258.5 |
| 2,927,582 | 3/1960 | Berkman et al. _______ 23—258.5 |
| 2,972,349 | 2/1961 | De Wall ___________ 23—258.5 |
| 3,212,499 | 10/1965 | Koreski ___________ 23—258.5 |

JAMES H. TAYMAN, Jr., Primary Examiner

U.S. Cl. X.R.

128—214.2; 210—321; 137—88, 93